July 7, 1931.   L. W. STETSON   1,813,686

BLADE HOLDER

Filed Aug. 21, 1930

Witness
Paul F. Bryant

Inventor
Leon W. Stetson

Patented July 7, 1931

1,813,686

UNITED STATES PATENT OFFICE

LEON W. STETSON, OF WEST NEWTON, MASSACHUSETTS

BLADE HOLDER

Application filed August 21, 1930. Serial No. 476,813.

The present invention relates to holders or containers for cutting blades, such as those employed in safety razors.

It is a matter of common knowledge that a razor blade is better adapted to the performance of its intended function if it is not used daily. The purpose of the present invention is to provide a unique and compact form of container which is capable of maintaining an orderly sequence of blades in sufficient supply for several days' use, preferably a week.

I propose to accomplish the desired purpose of my invention by providing a series of blade-holding compartments, each adapted to hold a single blade and each marked or indicated in such a fashion as to denote the day on which the blade is to be used. The blades may be easily removed from and placed in the individual compartments, and when properly positioned therein are separated from one another with their cutting edges protected and prevented from chafing.

In the accompanying drawings illustrating the preferred form of the invention,

Figure 1:
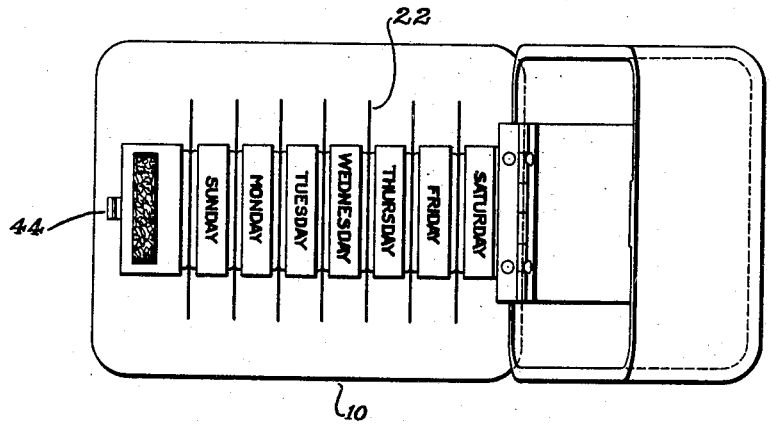
Fig. 1 represents a top plan view of a container with the cover open, and illustrating the blades contained therein.
Figure 2:
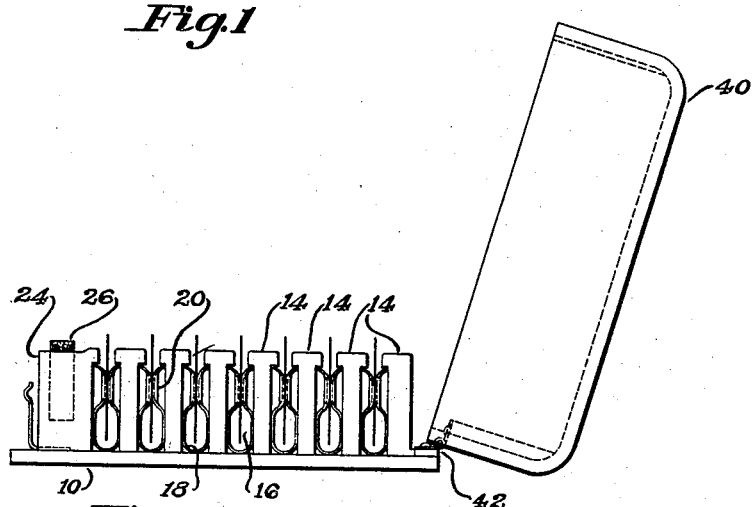
Fig. 2 is a side elevation of the container shown in Fig. 1.

The container comprises essentially a base portion 10, comparatively thin, and of sufficient width to extend beyond the blades, the base being provided with a series of partitions 14 forming individual blade compartments 16. In the illustrated embodiment of the invention, these compartments number seven, enabling the supply of blades for an entire week to be properly handled. The blade is retained within each compartment by a spring clip 18 provided with opposed gripping portions 20 which are intended to engage the blade opposite the usual opening formed therein, and maintain the blade in the suspended position, as shown in Fig. 2, with the lower edge positioned above the bottom of the compartment. This type of device is suited to either double-edge blades or single-edge blades employed in certain types of safety razors. It will be observed from an inspection, more particularly of Fig. 1, that the opposite ends of the blades, which are indicated at 22, project beyond the partitions at opposite sides to enable the blades to be grasped and readily removed from the compartments. Each one of the partitions may be conveniently provided on its top portion in a manner clearly visible with an indicating mark, such as a day of the week. As shown in the drawings, each compartment is marked with one day of the week, and if the blades are successively used, the supply is adequate for the entire week without repeated use of any single blade on successive days. The end partition 24 is somewhat wider than the remaining partitions, and is provided with a slab of art gum or similar cleaning material 26 which projects thereabove and serves as a wiper for cleaning the edge of the blade if the latter is drawn thereover. This affords a convenient practical means of maintaining the edge portions of the blade clean after use and before replacement in the individual compartments.

Figure 3:
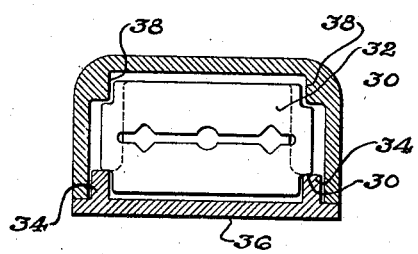
Fig. 3 is a sectional elevation of a slightly modified form of container particularly adapted for the retention of double edge blades of a well-known type.

The construction shown in Fig. 3 is particularly adapted for retention of double-edge blades of the Gillette type having shoulders 30 at opposite corners. With this construction, compartments are formed by individual partitions 32, and the blades are held in place therebetween by longitudinal supports 34 formed on the base 36. The upper shoulders are engaged by retaining members 38 mounted upon the interior of the cover and adapted to engage and clamp the blades in position when the cover is closed. With this construction it will be evident that both edges of the blade are protected, and the latter may be easily removed from the compartments and made available for use. As indicated in Figs. 1 and 2, a cover 40 of conventional form is hinged to the base at 42, normally retained in closed position by a spring catch 44.

What is claimed is:

1. A blade-holding container comprising a base portion, a series of partitions mounted on the base portion to form separated, vertical compartments, means for maintaining a blade suspended vertically in each compartment with the edge removed from the wall of the compartment, means for cleaning the surface of a blade, and a removable cover for normally closing the container.

2. A blade-holding container comprising a series of partitions forming individual compartments, spaced supporting shoulders located in each compartment designed to engage and support a blade with the cutting edge removed from the wall of the compartment, and a removable cover having similarly spaced shoulders for retaining the blades in predetermined position when the cover is closed.

LEON W. STETSON.